US006920445B2

(12) United States Patent
Bae

(10) Patent No.: US 6,920,445 B2
(45) Date of Patent: Jul. 19, 2005

(54) CONTENTS BROWSING SYSTEM WITH MULTI-LEVEL CIRCULAR INDEX AND AUTOMATED CONTENTS ANALYSIS FUNCTION

(76) Inventor: Dong-Hoon Bae, Wooseong S-cha Apt. 801-906, Gaepo-dong, Kangnam-ku, Seoul (KR)

( * ) Notice: Subject to any disclaimer, the term of this patent is extended or adjusted under 35 U.S.C. 154(b) by 276 days.

(21) Appl. No.: 09/839,944

(22) Filed: Apr. 20, 2001

(65) Prior Publication Data

US 2002/0059271 A1 May 16, 2002

(30) Foreign Application Priority Data

Apr. 21, 2000 (KR) ......................................... 2000-21349

(51) Int. Cl.⁷ ............................................. G06F 17/30
(52) U.S. Cl. .......................... 707/2; 707/102; 715/834
(58) Field of Search ............................. 707/102, 104.1, 707/100, 1, 2; 715/712, 713, 834; 345/712, 713, 744, 745

(56) References Cited

U.S. PATENT DOCUMENTS

| | | | | |
|---|---|---|---|---|
| 5,048,903 A | * | 9/1991 | Loblein ................... 312/234.1 |
| 5,297,253 A | * | 3/1994 | Meisel ....................... 345/854 |
| 5,544,354 A | * | 8/1996 | May et al. ..................... 707/4 |
| 5,546,529 A | * | 8/1996 | Bowers et al. .............. 345/848 |
| 5,825,355 A | * | 10/1998 | Palmer et al. .............. 345/712 |
| 5,850,218 A | * | 12/1998 | LaJoie et al. ................. 725/45 |
| 5,875,446 A | * | 2/1999 | Brown et al. ................... 707/3 |
| 5,963,205 A | * | 10/1999 | Sotomayor .................. 715/531 |
| 5,974,413 A | * | 10/1999 | Beauregard et al. ........... 707/6 |
| 6,101,506 A | * | 8/2000 | Ukai et al. .................. 707/203 |
| 6,144,968 A | * | 11/2000 | Zellweger ................ 707/104.1 |
| 6,199,098 B1 | * | 3/2001 | Jones et al. ................. 709/203 |
| 6,415,319 B1 | * | 7/2002 | Ambroziak ................. 709/219 |
| 6,421,716 B1 | * | 7/2002 | Eldridge et al. ............ 709/219 |
| 6,425,129 B1 | * | 7/2002 | Sciammarella et al. ....... 725/38 |
| 6,430,558 B1 | * | 8/2002 | Delano .......................... 707/5 |

* cited by examiner

Primary Examiner—Safet Metjahic
Assistant Examiner—Brian Goddard
(74) Attorney, Agent, or Firm—Christie, Parker and Hale, LLP

(57) ABSTRACT

Disclosed is a circular index structure. The contents feature analyzer analyzes the contents and stores information about virtual locations to be located on the indexes of the respective contents, and information on the physical indexes for displaying the corresponding contents, in a memory. The contents selector extracts the information on the physical indexes using the information stored in the memory according to the user's request, and displays the contents. Therefore, the user can easily select desired various contents having various channels and categories such as the digital televisions and the web more intellectually, and accordingly, the user's confusion caused by the overflow of information is prevented and the user can quickly access the contents.

23 Claims, 2 Drawing Sheets

● Representative contents index
○ General contents index

CONTENTS BROWSING SYSTEM WITH MULTI-LEVEL CIRCULAR INDEX AND AUTOMATED CONTENTS ANALYSIS FUNCTION

CROSS-REFERENCE TO RELATED APPLICATION

This application claims priority of Korea patent Application No. 2000-21349, filed on Apr. 21, 2000.

BACKGROUND OF THE INVENTION

1. Field of the Invention

The present invention relates to a method for forming a contents analysis index structure and a contents display method. More specifically, the present invention relates to a contents browsing system having a circular index structure and configuring index information using an automated contents feature analysis process.

2. Description of the Related Art

Recently, the techniques of media contents such as the Internet and digital satellite broadcasts have greatly developed and expanded. However, the variety and great increase caused by this development has exceeded user capacity and has made it more difficult to appropriately select desired media contents.

Also, this overflow of information generates inconvenience to the user, and causes a bottleneck phenomenon that prevents the user from accessing the information of contents producers.

Data structures and search methods for handling contents and displaying the same are categorized as a tree structure, a queue and stack structure for personal computers, a circular structure for televisions, a linear structure for AM/FM radios, a hypertext structure for webs, a keyword search method, a code reference method, and a search method according to classifications. However, they are not adequate for new media developments.

For example, in the case of digital audio (e.g., MP3) reproduction devices, users nowadays download or transmit hundreds of compressed audio data via the Internet according to the developments of storage media, and in the near future, users will access almost limitless contents via a wireless network while the users are mobile. However, hardwired user interfaces installed in the present devices are fit to functions (e.g., FF, RWD, Play, Stop and indexes) of conventional media such as those for compact discs or tapes. The functions are adequate in the case of using about ten content items, but in the case of trying to use more than ten content items, a better method is required.

Also, it is difficult to classify the various content items and manage the same, and if the content items are classified into categories according to the tree structure, depths and branches of the corresponding contents are greatly increased because of the features of the tree structure, and hence it is difficult to browse the contents. Even if the circular structure used for television is used, the time needed for one rotation of the circle is increased when the number of content items is increased. In the case of the method using a keyword, the user must previously know correct information about the content item. In the case of a search by classification, it is difficult to determine clear classifications since the characteristics of the content items are various and ambiguous.

The above-described problems are generated because of restrictions of information that the user can receive at one time. If corresponding manipulation and usage become more difficult, the user will feel annoyed.

SUMMARY OF THE INVENTION

It is an object of the present invention to provide a system for generating a multi-level circular index structure for effectively classifying contents and easily displaying the same.

In one aspect of the present invention, in a contents structure for analyzing information on features of respective contents and arranging the contents in order for a user to easily access the contents, a circular index structure comprises: a virtual contents index arranged in a circular method for the user's easy access after the contents are classified according to categories; and physical contents dependent on a bottom index of the virtual contents index, and moving to corresponding contents according to the user's selection of the contents.

The contents indexes are classified into predetermined categories according to information extracted by the user's searching process or a keyword method, and the contents item that best exemplifies the features of a category is set as a representative contents index and is arranged in a circular method. The representative contents indexes form top contents indexes, and the virtual contents index is connected to at least one top contents index. The contents that have the representative features found through a comparison analysis of category representative features, first comparison features (features common to counterclockwise-adjacent contents) and second comparison features (features common to clockwise-adjacent contents) according to the category features are connected to a higher level index, and indexes of remaining virtual contents are located between the representative contents indexes according to weighting values.

In another aspect of the present invention, in a contents display system for receiving a plurality of contents from media such as a digital television, a cable television broadcast and network contents, analyzing information on the contents, storing the contents in a memory as a database, and outputting the stored contents according to the user's access, a contents display system comprises: a memory; a contents feature analyzer for analyzing features of at least one contents unit provided from the outside, and storing information on the analyzed features and information on physical contents for moving to corresponding contents in the memory; and a contents selector for extracting the contents corresponding to the information on the physical contents using the feature information stored in the memory according to the user's request for switching the contents, and outputting the contents.

BRIEF DESCRIPTION OF THE DRAWINGS

The accompanying drawings, which are incorporated in and constitute a part of the specification, illustrate an embodiment of the invention, and, together with the description, serve to explain the principles of the invention.

DETAILED DESCRIPTION OF THE PREFERRED EMBODIMENTS

Figure 1:
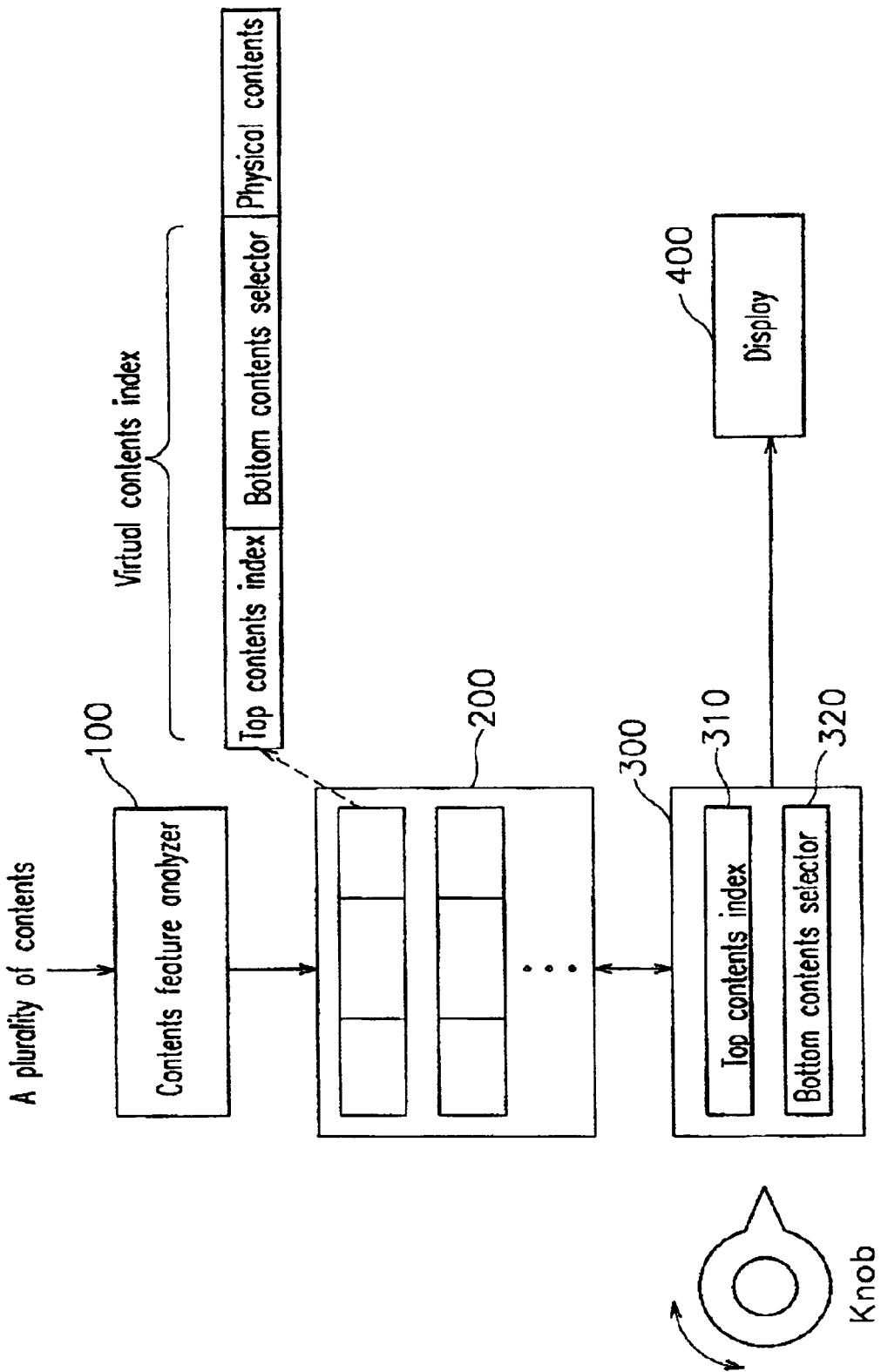
FIG. 1 shows a contents browsing system according to a preferred embodiment of the present invention.

In the following detailed description, only the preferred embodiment of the invention has been shown and described, simply by way of illustration of the best mode contemplated by the inventor(s) of carrying out the invention. As will be realized, the invention is capable of modification in various obvious respects, all without departing from the invention. Accordingly, the drawings and description are to be regarded as illustrative in nature, and not restrictive FIG. 1 shows a contents browsing system according to a preferred embodiment of the present invention.

As shown, the contents browsing system comprises a contents attribute analyzer 100, a memory 200, a contents selector 300 and a display 400.

The contents attribute analyzer 100 dynamically responds to at least one contents item such as images, texts, voices and moving pictures provided from the outside, analyzes corresponding attributes of the contents in real-time or for each predetermined time frame, and forms index information of an atomic level using the analyzed attributes, and the index information of the atomic level is processed by a filtering process that determines patterns and characteristics so as to obtain an order, a location and a role within the particular atomic level and also to obtain relative location values with respect to both adjacent contents of a two-dimensionally connected structure and dimensional location characteristics with respect to connection relationships between other contents within a top molecular level that is connected to the atomic level.

A set of contents that configure an atomic level forms a connection relationship between the respective atomic levels and between the respective multi-level molecular level circles. A representative contents index that has representative features of the atomic level contents functions as a path for connecting to a top contents index, and thereby all the contents of the whole structure are virtually connected. When compared to the hypertext structure, the hypertext structure is a randomly linked structure, but the three-dimensional structure of the above-noted data is processed by a reference database (such as dictionary definitions and other setting values) and has a hierarchical relationship.

An Internet compact disc database (CDDB) for providing information such as titles of songs using CD recognition codes in the case of digital music contents, and an event information table (EIT) on which various kinds of information on television programs in the case of digital televisions can be used for the reference database. In addition, a lexicon database or a user's own standards can also be used.

A data structure for storing in the memory 200 comprises a top contents index, a bottom contents index, and a recursively included index. The lowest structure of the above-noted virtual indexes is an atomic level index, including information on a connection to the contents, and a set of the atomic level indexes forms a molecular level contents index.

Here, as to the virtual contents index stored in the memory, in the case the atomic level information analyzed in real-time or at a predetermined time frame is to be located at a top index, the contents that have the representative features are connected to the top index and the indexes of the remaining general virtual contents are located between the representative contents indexes according to weighting values after a comparison and analysis of category representative features, first comparison features (features common to counterclockwise-adjacent contents) and second comparison features (features common to clockwise-adjacent contents). The above-noted representative contents index becomes a connection path to the top contents index and has features that represent similar-featured contents of the adjacent same-level indexes.

The physical contents information is used to call the contents requested by the user.

The contents selector 300 comprises a top contents selector 310 and a bottom contents selector 320. When a user requests a contents switching process from the contents selector 300, the contents selector 300 extracts the contents corresponding to the physical contents from the top or bottom contents index stored in the memory 200 and provides the extracted contents to the display 400.

For example, the contents selector 300 determines whether the user rotates a knob while pressing the same or just rotates the knob without pressing it according to predetermined manipulations of the button, and in the case the user is concurrently pressing and rotating the knob, the user accesses along an index circle of the higher contents, and in the other case, the user accesses along an index circle of the lower contents indexes. Also, when a move to a lower or higher index is made, the existing higher or lower index relationship is changed. The movement is possible between the highest top index and the lowest bottom index connected to the physical contents index.

According to the above-noted structure, the user can search and find desired contents using abstract meanings without the user's previously recognized information or keywords, and since the user can freely move between the top and bottom indexes, moving time is reduced and the moving process becomes simplified compared to the step-by-step movement of the tree structure.

A method for assigning the indexes of the contents according to classification of types and categories, keywords, viewing patterns and database reference will now be described.

First, as to the classification according to the types and the categories, some contents can be classified as at least two types. For example, a movie can be horror and comic, or comic and tragic. This ambiguity, or the overlaps of the categories, is caused by the features of the contents production that always pursue new and creative forms and contents. Hence, particular contents are not provided at a specific location but can have duplicated instance indexes at plural locations according to the corresponding classification.

Second, as to the classification according to keywords, in the case of the advanced television systems committee (ATSC) standard digital television, the contents attribute analyzer 100 extracts desired keywords from program cotting information such as the extended text table (ETT) and the extended text messages (ETM) and categorizes the keywords. The contents attribute analyzer 100 dynamically generates a temporary group according to actors, directors, subjects or events. For example, when news on an occurrence of an incident at a troubled area is generated, news stories, documents on the history of political disputes and even sightseeing information (provided by leisure channels) are also provided, and corresponding web contents such as a survey of public opinion or a panel discussion can also be provided, as a package program. Or, in the case a first episode of a drama is broadcast on a channel A, a second episode on a channel B and a third episode on a channel C, the three episodes can be temporarily grouped as if they are on the same channel.

Third, as to classification according to viewing patterns, when the present invention is applied to television, the user's viewing habits are recorded and analyzed, and a default channel is set as the top representative of the virtual index structure. For example, if the TV viewer frequently watches a particular news program at 9 pm, this habitual pattern is recognized, and therefore a default channel can be that one on which the 9 pm news is frequently watched, which would then be initially displayed when the TV viewer turns the television on at 9 pm. The representative index of the topmost virtual index functions as a portal, like a default homepage on a web site, and displays core contents such as commercials or program guides.

Fourth, as to the classification according to the database reference, when searching the CDDB for CD music via the Internet, the user can obtain various kinds of information such as artists, titles of songs and lists of songs to use as contents analysis data at the atomic level.

In the above, the methods for assigning the indexes of the contents according to the classifications of the types and categories, the keywords, the viewing patterns and the database reference have been described.

Also, a skilled person can combine at least two of the above-noted classification methods so as to assign the indexes of the contents. For example, the user can set the classifications of the types and categories as the first rank, the classification of the keywords as a second rank, and the classification of the viewing patterns as a third rank.

Since the hardwired interface method used in the preferred embodiment of the present invention has a three-dimensional structure of mixed two-dimensional virtual indexes, a structure combined with a rotary knob and a push button is selected. In order to move within the bottom index structure, the user rotates the knob in the clockwise or counterclockwise direction, and in order to move within the top index circle, that is, to move between the representative indexes of the bottom indexes, the user presses and rotates the push button.

By the above-described heuristic method, the user can learn the usage without referring to a manual.

Figure 2:
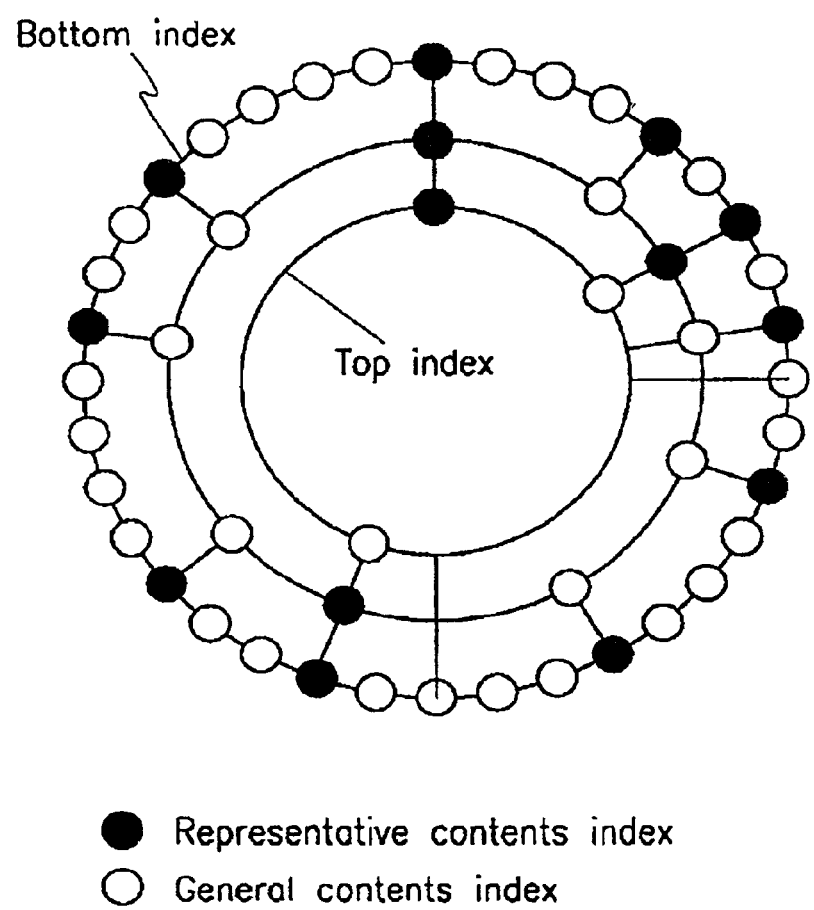
FIG. 2 shows a multi-level circular index structure according to the preferred embodiment of the present invention.

FIG. 2 shows a multi-level circular index structure according to the preferred embodiment of the present invention.

Referring to FIG. 2, as to the structure of the contents indexes, the bottom index structure is connected to the contents information of the atomic level. The index structure of the molecular level that is higher than the bottom index structure includes at least two top and bottom index structures, and, a set of the contents indexes that has representative features among a plurality of contents that have similar features in the bottom index structure forms a top index structure and functions as a path for connecting the top and bottom indexes. In this instance, the number of the contents that have similar features and the number of the representative contents have no limits, and a contents index can have a plurality of virtual locations. However, since people have a very limited memory, the effectiveness of searching the whole system can be maintained when the number of the indexes between the representative indexes is below ten, the number of the representative indexes is about twenty, and the levels of the total indexes is below ten.

Locations of the contents index can also be shown as angles, and the angles can be configured by applying a hue model (e.g., displaying the red as the zero degree) for visualization effects. Accordingly, recognition of the locations of the respective contents can be provided to the users.

As to moving between the contents indexes, the user moves between the bottom contents indexes in a clockwise or counterclockwise direction, or moves between the top contents indexes, which is the faster method, so that the searching process becomes more effective. Also, the user can move between the levels and in this instance, the top and bottom relationships are varied.

As described above, the present invention provides software and its corresponding hardwired controller that analyzes various contents, locates the analyzed contents on a circular structure according to their features, and enables the user to move between the top and bottom levels so that the user can quickly and intuitively search for and display the target content. This software dynamically responds to the contents information generated by particular events in real-time or during a predetermined time frame.

The present invention can be used together with the methods of the tree structure, the hypertext structure and keyword searching, and it minimizes errors generated by the user's false manipulations.

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

What is claimed is:

1. A content indexing structure stored in a computer-readable medium, comprising:

a first indexing level having a plurality of first-level content indexes coupled in a substantially circular manner, a first first-level content index being selected from a first set of first-level content indexes sharing a first category feature as a first representative index for the first set, and a second first-level content index being selected from a second set of first-level content indexes sharing a second category feature as a second representative index for the second set;

a second indexing level having a plurality of second-level content indexes coupled in a substantially circular manner, the second-level content indexes corresponding to representative indexes in the first indexing level, wherein a user traverses from the first set of first-level content indexes sharing the first category feature to the second set of first-level content indexes sharing the second category feature in response to a first user action without first invoking the second indexing level, and traverses second-level content indexes and representative indexes in the first indexing level in response to a second user action.

2. The structure of claim 1, wherein the category is selected from a group consisting of types, keywords, viewing patterns and database reference data.

3. The structure of claim 1, wherein moving between contents indexed by the content indexing structure includes moving from the first indexing level to the second indexing level or from the second indexing level to the first indexing level according to a user's manipulations of an input device.

4. The structure of claim 1, wherein moving between contents indexed at the first indexing level includes moving an input device in a clockwise or counterclockwise direction between associated first level content indexes in a substantially circular manner according to a user's manipulations of the input device.

5. The structure of claim 1, wherein moving between contents indexed at a second indexing level includes moving an input device in a clockwise or counterclockwise direction between associated second level content indexes in a circle according to a user's manipulations of the input device.

6. The structure of claim 1, wherein when a present indexing level is changed according to the a user's manipulation of an input device, a relationship of the first and second indexing levels with respect to the present indexing level is updated after the movement.

7. The content indexing structure of claim 1, wherein each first-level content index is associated with a weighing value indicative of an association with a corresponding second-level content index.

8. The content indexing structure of claim 7, wherein the first first-level content index is selected as the first representative index based on a first weighing value, the first weighing value indicating that the first first-level content index is most closely associated with the first category feature, and the second first-level content index is selected as the second representative index based on a second weighing value, the second weighing value indicating that the second first-level content index is most closely associated with the second category feature.

9. The content indexing structure of claim 1, wherein each second-level content index is logically coupled to a corresponding representative index in the first indexing level.

10. The content indexing structure of claim 1, wherein each second-level content index is an index to a particular media content.

11. A content display system comprising:
a memory;
a contents features analyzer for analyzing features of at least one content provided from a media source and storing information on the analyzed features and information on one or more content indexes for accessing the content from the memory; and
a content selector for retrieving the content corresponding to the content index stored in the memory according to a user's request, wherein indexes are generated according to a content indexing structure based on the analyzed features, the content indexing structure including:
a first indexing level having a plurality of first level content indexes coupled in a substantially circular manner, a first first-level content index being selected from a first set of first-level content indexes sharing a first category feature as a first representative index for the first set, and a second first-level content index being selected from a second set of first-level content indexes sharing a second category feature as a second representative index for the second set; and
a second indexing level having a plurality of second level content indexes coupled in a substantially circular manner, the second-level content indexes corresponding to representative indexes in the first indexing level,
wherein a user traverses from the first set of first-level content indexes sharing the first category feature to the second set of first-level content indexes sharing the second category feature in response to a first user action without first invoking the second indexing level, and traverses second-level content indexes and representative indexes in the first indexing level in response to a second user action.

12. The system of claim 11, wherein each representative index best exemplifies its respective category feature.

13. The system of claim 11, wherein the category is selected from a group consisting of types, keywords, viewing patterns and database references extracted from the content information.

14. The system of claim 11, wherein moving between content indexes by the content indexing structure includes moving from the first indexing level to the second indexing level or from the second indexing level to the first indexing level according to a user's manipulations of the content selector.

15. The system of claim 11, wherein moving between content indexes at the first indexing level includes moving the content selector in a clockwise and counterclockwise direction between associated first level content indexes according to a user's manipulations of the content selector.

16. The system of claim 11, wherein moving between contents indexed at the second indexing level includes moving the content selector in a clockwise and counterclockwise direction between associated second level content indexes according to a user's manipulations of the content selector.

17. The system of claim 11, wherein when a user moves to a third indexing level coupled to the first and second indexing level, a relationship of the first and second indexing levels with respect to the third indexing level is changed.

18. The system of claim 11, wherein the content selector comprises:
a first content selector for controlling a display of contents associated with the first level content indexes when the first level content indexes stored in the memory are selected according to a user's manipulations; and
a second content selector for controlling a display of contents associated with the second level content indexes when the second level content indexes stored in the memory are selected according to a user's manipulations.

19. The content display system of claim 11, wherein each first-level content index is associated with a weighing value indicative of an association with a corresponding second-level content index.

20. The content display system of claim 19, wherein the first first-level content index is selected as the first representative index based on a first weighing value, the first weighing value indicating that the first first-level content index is most closely associated with the first category feature, and the second first-level content index is selected as the second representative index based on a second weighing value, the second weighing value indicating that the second first-level content index is most closely associated with the second category feature.

21. The content display system of claim 11, wherein each second-level content index is logically coupled to a corresponding representative index in the first indexing level.

22. The content display system of claim 11, wherein each second-level content index is an index to a particular media content.

23. A content indexing structure stored in a computer-readable medium, comprising:
a first indexing level having a plurality of first-level content indexes coupled in a substantially circular manner, a first first-level content index being selected from a first set of first-level content indexes sharing a first category feature as a first representative index for the first set, and a second first-level content index being selected from a second set of first-level content indexes sharing a second category feature as a second representative index for the second set;
a second indexing level having a plurality of second-level content indexes coupled in a substantially circular manner, the second-level content indexes being composed of the representative indexes in the first indexing level,
wherein a user traverses from one first-level content index to another first-level content index in response to a first user action, and traverses from one representative index to another representative index in the first and second indexing levels in response to a second user action.

* * * * *